3,374,186
CURING POLYEPOXIDE COMPOUNDS WITH A POLYAMINE

Franz Steden, Mannheim, and Ludwig Beer and Oskar Lissner, Ludwigshafen (Rhine), Germany, assignors to Badische Anilin- & Soda-Fabrik Aktiengesellschaft, Ludwigshafen (Rhine), Germany
No Drawing. Filed May 21, 1965, Ser. No. 457,801
Claims priority, application Germany, June 9, 1964, B 77,162
5 Claims. (Cl. 260—2)

This invention relates to a process for curing polyepoxides. More particularly, the invention relates to a new process for curing polyepoxides using a special class of polyamines, and to the resulting cured products.

It is known that polyepoxide compounds may be cured with polyamines at room temperature or by heating to form infusible and insoluble epoxide resins. Difficulties are often encountered in curing, however, if the polyamines which are suitable as hardeners for the particular polyepoxide compounds are not used. Some polyamines are too reactive with respect to the polyepoxides and thereby limit the processing possibilities for curable mixtures of polyepoxide and polyamine, as in the case when using aliphatic polyamines. Other polyamines, particularly aromatic polyamines, are not reactive enough so that elevated temperatures are required for curing the mixtures of polyepoxide and polyamine. In the production of homogeneous mixtures of polyepoxides and hardeners it is also often a disadvantage that the polyamine component is a solid and uniform mixing of the polyamine with the polyepoxide is only achieved at elevated temperatures at which a premature cure of the mixtures may take place. The viscosity of the polyamine used for curing is also if importance, particularly when using fillers, because the possible content of filler is substantially determined by the viscosity of the curable mixture. The use of a polyamine is also dependent on the possibility of producing it simply so that it is capable of competing on the market. Polyamines hitherto used for curing polyepoxide compounds are not in general satisfactory in all respects.

It is an object of the invention, therefore, to provide a new process for curing polyepoxides. It is a further object to provide a method for curing polyepoxides such as glycidyl polyethers of polyhydric alcohols and phenols with new amine curing agents. It is a further object to provide a new process for curing polyepoxides at room temperature with curing agents which are liquid. Another object of the invention is mixtures of polyepoxides with polyamines which have an adequately long pot-life and can be cured at room temperature, and the production of insoluble and infusible products therefrom which have good mechanical properties.

These and other objects and advantages of the invention are achieved by the novel process of the invention which comprises mixing and reacting a polyepoxide containing more than one 1,2-epoxy group with a 1-aminomethyl-2-aminopropylcyclohexane at temperatures in the range from about 20° to about 200° C.

1-aminomethyl-2-aminopropylcyclohexane may bear one or more, particularly one or two, substituents. The substituents which 1-aminomethyl-2-aminopropylcyclohexane may bear include cycloaliphatic, aliphatic-aromatic and aromatic hydrocarbon radicals having six to twelve carbon atoms and particularly aliphatic hydrocarbon radicals having one to eight carbon atoms. The substituents may also be attached to the 1-aminomethyl-2-aminopropylcyclohexane via an ether grouping, as in the case of the methoxy or ethoxy radical. The methyl group is particularly suitable as a substituent.

Low viscosity and high viscosity curable polyepoxides, which may be used in the fields of both cast resins and lacquers, may be cured with particular advantage with these polyamines at room temperature to form clear, colorless and hard resins. In its reaction behavior with respect to polyepoxides, 1-aminomethyl-2-aminopropylcyclohexane is similar to aliphatic polyamines, for example diethylene triamine and dipropylene triamine. It has the advantage over these, however, that the reaction proceeds less violently so that a pot-life of adequate length is available and bubbles are not formed in the resins during curing. The longer pot-life as compared with low molecular weight aliphatic polyamines means that curing of polyepoxides may be carried out without adding other slow-acting polyamines.

The curing agents according to the invention also have the advantage over aliphatic polyamines that two-component epoxide finishes prepared therewith do not need preliminary reaction, dry superficially in a shorter time and give clear films which do not exhibit any blooming effect.

Insoluble, infusible products having good impact strength, good resistance to heat, high elongation, tensile strength and tensile strength at rupture are obtained by the process according to this invention. The products are tack free and have very good resistance to acids, alkalies, water and aromatic hydrocarbons, such as toluene.

Owing to the low viscosity of the liquid curing agents it is particularly easy to incorporate fillers, pigments, dyes, plasticizers, resins and similar products into the mixtures of polyepoxide and curing agent.

Industrial production of polyamines having satisfactory curing properties is usually difficult. The polyamine to be used according to this invention is however easily prepared by simple synthesis. This constitutes another advantage. For the production of 1-aminomethyl-2-aminopropylcyclohexane, isomerized dihydromuconodinitrile is added on to butadiene and the nitrile group is converted into the amino group by conventional methods. The unsubstituted polyamine is a colorless liquid (color number 1) having a low viscosity (outflow time from DIN beaker 4 at 20° C.=13.5 seconds) and a boiling point of 103° C. at 0.6 mm. Hg. Its production is not the subject of the present invention.

Polyepoxides which have more than one 1,2-epoxy group in the molecule are suitable as polyepoxides for the process. Preferably the 1,2-epoxy groups are terminal. Aliphatic polyglycidyl ethers, which can be obtained in conventional manner by reaction of polyalcohols, such as pentaerythritol, glycerol, trimethylolpropane or butanediol, with epichlorohydrin, are particularly suitable. Other suitable polyepoxides are aromatic polyglycidyl ethers and polyglycidyl esters, such as are obtainable for example by reaction of phenols, such as 2,2-bis-(4-hydroxyphenyl) - propane or bis - (4 - hydroxyphenyl)-methane, with epichlorohydrin, and also reaction products of polyamines with epichlorohydrin. Polyepoxides which are obtainable from unsaturated hydrocarbons and hydroperoxides, such as vinylcyclohexene dioxide, dipentene dioxide, cyclododecane triepoxide, may also be successfully used. Another group of suitable polyepoxide compounds includes the glycidyl ethers of novolaks which may be obtained by condensing an aldehyde with a polyhydric phenol. The said polyepoxides may be used alone or mixed together, if necessary with the addition of monoepoxide compounds.

The amount of polyamine used for curing the polyepoxides may be varied within wide limits. Thus amounts of about 5 to 50 parts, particularly 10 to 30 parts by weight of polyamine may be used for each 100 parts by weight of polyepoxide. It is preferred to use the 1-aminomethyl-2-aminopropylcyclohexane (if desired bearing substituents) in such an amount that there is an active hydrogen atom attached to nitrogen available for each epoxide group of the polyepoxide compound. In some case, however, the use of larger amounts of amine is advantageous.

The polyamine components according to this invention may advantageously be mixed with other more highly viscous or less reactive polyamines, such as aromatic polyamines, and also with other conventional prior art epoxide resin curing agents such as are described in the book by A. Paquin, Epoxydverbindungen und Epoxydharze, Berlin-Gottingen-Heidelberg 1958.

The mixtures which contain polyepoxide compounds and unsubstituted or substituted 1-aminomethyl-2-aminopropylcyclohexane may be used without solvents or in association with conventional solvents, such as ketones, esters, alcohols, glycol ethers or hydrocarbons, if desired in admixture with each other.

If the polyepoxides are used as lacquers, it is often advantageous to add to the lacquer solutions a few percent, with reference to the epoxide compound, of a leveling agent. Examples of suitable leveling agents are urea-formaldehyde resins, phenol-formaldehyde resins, high molecular weight amines and their salts and quaternary ammonium compounds, for example reaction products of a fatty acid ester of diethylethanol amine with dimethyl sulfate.

The curing temperature depends on the use to which the curable mixture is put and on the type of any solvent which is also used. The mixtures may be cured at a temperature of from about 20° to about 200° C., but curing at about 20° to 50° C. and 80° to 150° C. is preferred.

In a preferred embodiment of the invention, the aliphatic polyepoxides to be cured are stirred with 1-aminomethyl-2-aminopropylcyclohexane in equivalent amounts at room temperature to form a homogeneous mixture and the mixture is poured into molds or spread out on sheets of glass or metal. The pot-life of these curable mixtures at room temperature is from about fifteen minutes to two hours.

The curable mixtures are suitable for the production of moldings, laminates and lacquer coatings having excellent properties. Electrical encapsulating compositions and water-clear, nontacky and hard castings may be prepared from them. The mixtures may also be used for impregnations.

The invention is further illustrated by the following examples. The parts specified in the examples are parts by weight.

EXAMPLE 1

3.55 parts of 1-aminomethyl-2-aminopropylcyclohexane and 16.2 parts of a reaction product of pentaerythritol with epichlorohydrin having an epoxide number of 0.62 are mixed at room temperature and pored into molds. Two hours later the clear uncolored casting is tack-free. It is kept at 70° C. for two hours for annealing. The molding obtained is stable in caustic soda solution and toluene.

EXAMPLE 2

3.55 parts of 1-aminomethyl-2-aminopropylcyclohexane and 20.0 parts of a reaction product of 2,2-bis-(p-hydroxyphenyl)-propane with epichlorohydrin (epoxide number 0.50) are stirred to form a homogeneous mixture which is pored into molds. Three hours later, the casting formed is tack-free. After it has been annealed for two hours at 70° C., a clear colorless molding is obtained which is stable in acids, alkalides and water and has resistance to heat up to 110° C.

EXAMPLE 3

1.78 parts of 1-aminomethyl-2-aminopropylcyclohexane and 8.10 parts of a reaction product of pentaerythritol with epichlorohydrin having an epoxide number of 0.62 are homogenized and then applied to sheets of metal or glass. The lacquer coating is cured (a) for twenty-four hours at room temperature or (b) for one hour at 120° C. and the pendulum hardness value and Erichsen value are determined:

(a) Pendulum value: 35 seconds; Erichsen value: 8.7;
(b) Pendulum value: 85 seconds; Erichsen value: 7.0.

EXAMPLE 4

100 parts of a reaction product of 2,2-bis-(p-hydroxyphenyl(-propane with epichlorohydrin having an epoxide value of 0.20 is dissolved in 100 parts of a solvent mixture of methyl isobutyl ketone, ethyl glycol and xylene (volumetric ratio 1:1:1). To improve flow, 5 parts of a urea-formaldehyde resin is added to the resin solution. 7.5 parts of 1-aminomethyl-2-aminopropylcyclohexane is then stirred in and the mixture is applied to glass, sheet metal and wood. At room temperature, clear films are obtained which are tack-free after three hours and thoroughly dry after six hours.

A film prepared under the same conditions but using diethylene triamine as curing agent, is cloudy and shows blooming effect. To obtain a clear film it is necessary to store the two-component finish prepared with diethylene triamine as curing agent for at least six hours prior to use.

We claim:
1. In a process for the production of insoluble and infusible products by mixing polyepoxides having more than one 1,2-epoxy group in the molecule with polyamines and curing the mixture at from about 20° to about 200° C. the improvement of using a 1-aminomethyl-2-aminopropylcyclohexane as the polyamine.

2. In a process for the production of insoluble and infusible moldings by mixing a glycidyl ether of polyhydric alcohols and phenols having more than one 1,2-epoxy group in the molecule with a polyamine and curing the mixture in a mold at a temperature of from about 20° to about 200° C. the improvement of using a 1-aminomethyl-2-aminopropylcyclohexane as the polyamine.

3. In a process for the production of insoluble and infusible coatings by mixing a glycidyl ether of polyhydric alcohols and phenols having more than one 1,2-epoxy group in the molecule with a polyamine and curing the mixture on a surface at a temperature of from about 20° to about 200° C. the improvement of using a 1-aminomethyl-2-aminopropylcyclohexane as the polyamine.

4. A hardenable composition comprising a mixture of a polyepoxide having more than one 1,2-epoxy group in the molecule and 1-aminomethyl-2-aminopropylcyclohexane, said amine being present in sufficient quantity to cure the composition.

5. An insoluble and infusible reaction product made by curing at a temperature in the range of about 20° to about 200° C. a mixture of a polyepoxide having more than one 1,2-epoxy group in the molecule and a 1-aminomethyl-2-aminopropylcyclohexane, said amine being present in an amount sufficient to cure the mixture.

References Cited
UNITED STATES PATENTS 2,951,824  9/1960  Bruin et al. _____ 260—2

WILLIAM H. SHORT, Primary Examiner.

J. PERTILLA, Assistant Examiner.